(12) United States Patent
Sato

(10) Patent No.: US 8,248,530 B2
(45) Date of Patent: Aug. 21, 2012

(54) ELECTRONIC DEVICE, COMMUNICATION SYSTEM, METHOD OF COMMUNICATION, AND PROGRAM

(75) Inventor: Naoyuki Sato, Chiba (JP)

(73) Assignee: Sony Corporation (JP)

( * ) Notice: Subject to any disclaimer, the term of this patent is extended or adjusted under 35 U.S.C. 154(b) by 720 days.

(21) Appl. No.: 12/383,997

(22) Filed: Mar. 31, 2009

(65) Prior Publication Data

US 2009/0256963 A1    Oct. 15, 2009

(30) Foreign Application Priority Data

Apr. 1, 2008    (JP) ............................... P2008-095467

(51) Int. Cl.
*H04N 7/00*    (2011.01)
*H04N 11/00*    (2006.01)

(52) U.S. Cl. .................... 348/552; 348/554; 348/705

(58) Field of Classification Search .......... 348/705–706, 348/725, 723, 553–555, 512, 515, 563, 569, 348/734; 725/131, 139, 151; *H04N 7/00, H04N 11/00*

See application file for complete search history.

(56) References Cited

U.S. PATENT DOCUMENTS

| | | | |
|---|---|---|---|
| 7,378,984 | B2 | 5/2008 | Suzuki et al. |
| 7,511,763 | B2 * | 3/2009 | Sasaki ............................ 348/515 |
| 7,583,319 | B2 * | 9/2009 | Ukai et al. .................... 348/515 |
| 2006/0280439 | A1 * | 12/2006 | Ukai et al. ...................... 386/94 |
| 2006/0291569 | A1 | 12/2006 | Kabuto et al. |
| 2007/0230909 | A1 * | 10/2007 | Mukaide et al. ................ 386/96 |

FOREIGN PATENT DOCUMENTS

| | | |
|---|---|---|
| JP | 2000222077 A | 8/2000 |
| JP | 2004-208290 A | 7/2004 |
| JP | 2007-006298 A | 1/2007 |
| JP | 2008-048137 A | 2/2008 |
| WO | 2007072821 A1 | 6/2007 |

OTHER PUBLICATIONS

Office Action from Japanese Application No. 2008-095467, dated Mar. 2, 2010.

* cited by examiner

*Primary Examiner* — Trang U Tran
(74) *Attorney, Agent, or Firm* — Lerner, David, Littenberg, Krumholz & Mentlik, LLP

(57) ABSTRACT

An electronic device includes a Consumer Electronic Control (CEC) device unit and a connected-device determination unit. The electronic device is capable of being connected to another electronic device having Extended Display Identification Data (EDID) information regarding capability, via a communication cable that enables transmission of video and audio data and enables exchange of connected-device control information. The connected-device determination unit determines a vendor of the other electronic device on the basis of at least one of the EDID information and a CEC message of the CEC unit obtained via the communication cable from the other electronic device, and changes processing on the basis of the vendor of the other device connected by the communication cable.

1 Claim, 11 Drawing Sheets

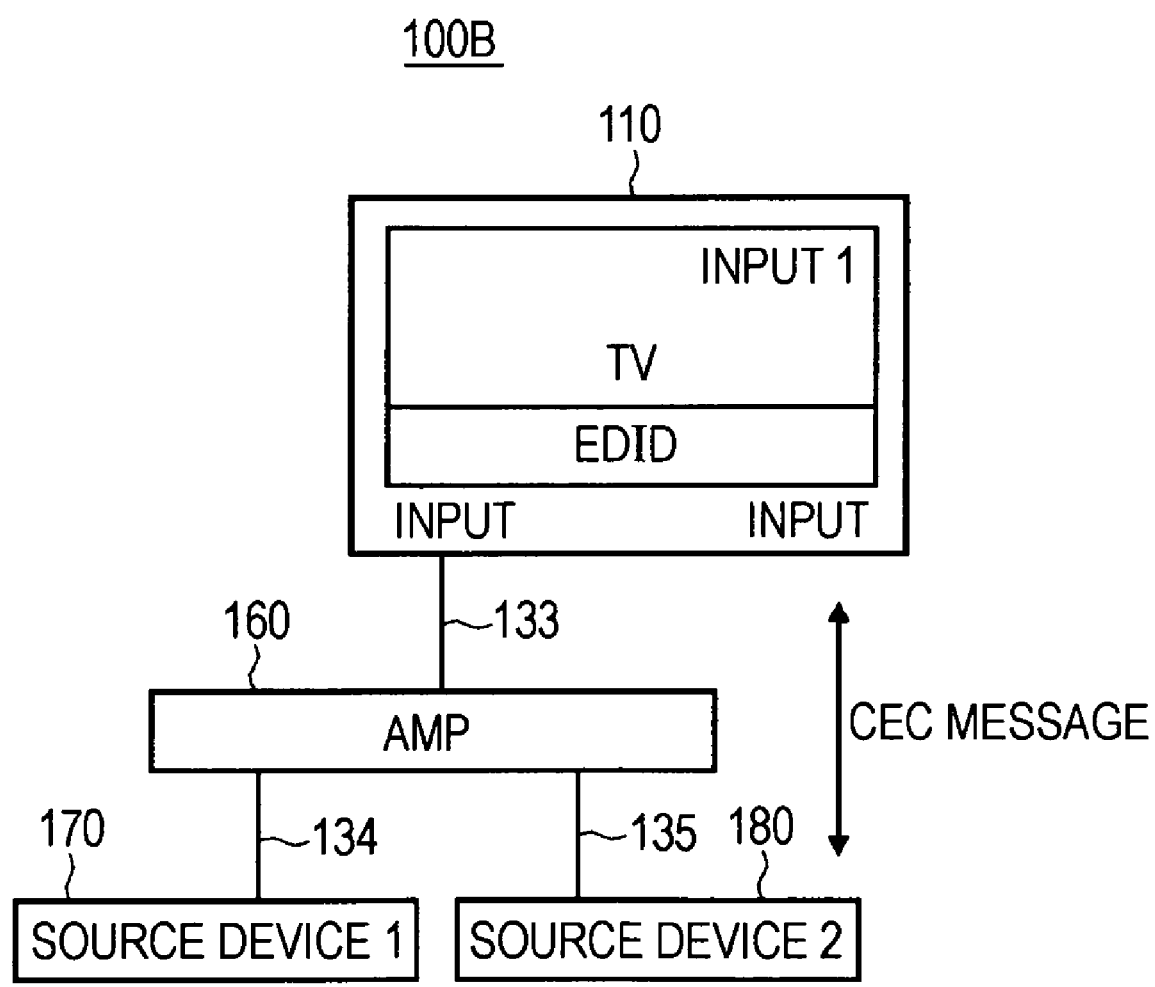

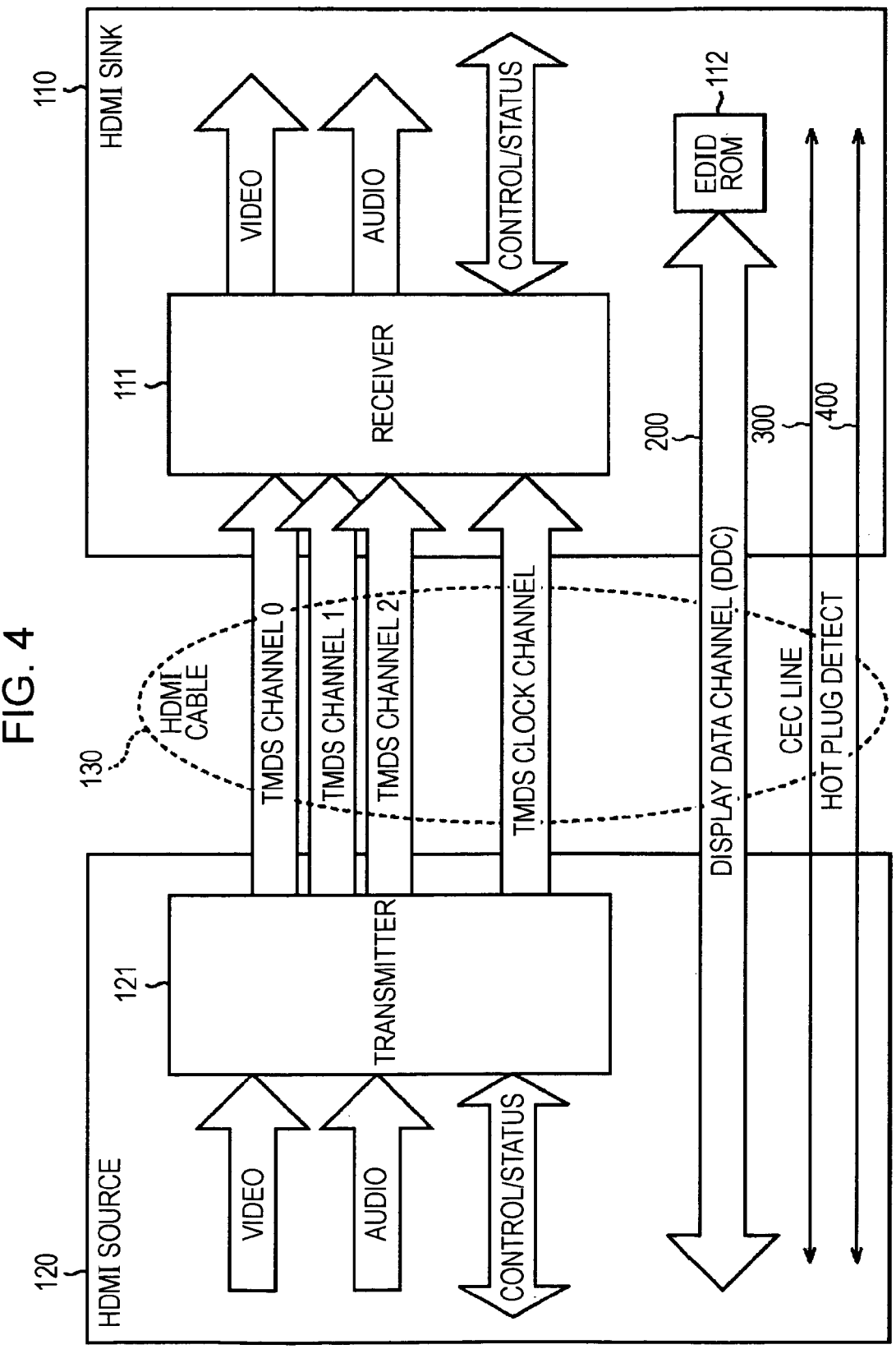

FIG. 5

| ADDRESS | NO. BYTES | DESCRIPTION | Bytes | | FORMAT |
|---|---|---|---|---|---|
| 00h | 8 | Header | | | |
| 00h | | | 1 | 00h | |
| 01h | | | 1 | FFh | |
| 02h | | | 1 | FFh | |
| 03h | | | 1 | FFh | |
| 04h | | | 1 | FFh | |
| 05h | | | 1 | FFh | |
| 06h | | | 1 | FFh | |
| 07h | | | 1 | 00h | |
| 08h | 10 | Vendor/Product Indentification | Bytes | | |
| 08h | | | 2 | ID Manufacturer Name | EISA 3-character ID |
| 0Ah | | | 2 | ID Product Code | Vendor assigned code |
| 0Ch | | | 4 | ID Serial Number | 32-bit serial number |
| 10h | | | 1 | Week of Manufacture | Week number |
| 11h | | | 1 | Year of Manufacture | Year |
| 12h | 2 | EDID Structure Version/Revision | Bytes | | |
| 12h | | | 1 | Version # | Binary |
| 13h | | | 1 | Revision # | Binary |
| 14h | 5 | Basic Display Parameters/Features | Bytes | | |
| 14h | | | 1 | Video Input Definition | |
| 15h | | | 1 | Max. Horizontal Image Size | cm. |
| 16h | | | 1 | Max. Vertical Image Size | cm. |
| 17h | | | 1 | Display Transfer Characteristic (Gamma) | Binary |
| 18h | | | 1 | Feature Support | |
| 19h | 10 | Color Charateristics | Bytes | | |

THIS "ID Manufacturer Name" PORTION IS USED.

FIG. 6

| ADDRESS | | WRITE DATA | | | | | | | | | READ DATA | |
|---|---|---|---|---|---|---|---|---|---|---|---|---|
| Dec | Hex | 7 | 6 | 5 | 4 | 3 | 2 | 1 | 0 | Hex | Dec | Hex | Dec |

| ADDRESS | | WRITE DATA | | | | | | | | | | | READ DATA | |
|---|---|---|---|---|---|---|---|---|---|---|---|---|---|---|
| Dec | Hex | 7 | 6 | 5 | 4 | 3 | 2 | 1 | 0 | Hex | Dec | Hex | Dec |
| ● | ### | 0 | 1 | 0 | 0 | 1 | 1 | 0 | 1 | ##### | ### | 4D | 77 |
| ● | ### | 1 | 1 | 0 | 1 | 1 | 0 | 0 | 1 | ##### | ### | D9 | 217 |

Apply To Write Data (Not yet) | ☑ Show Sequential Number

Analyze Read Data

ID Manufacturer Name = [SNY]

(Blank)

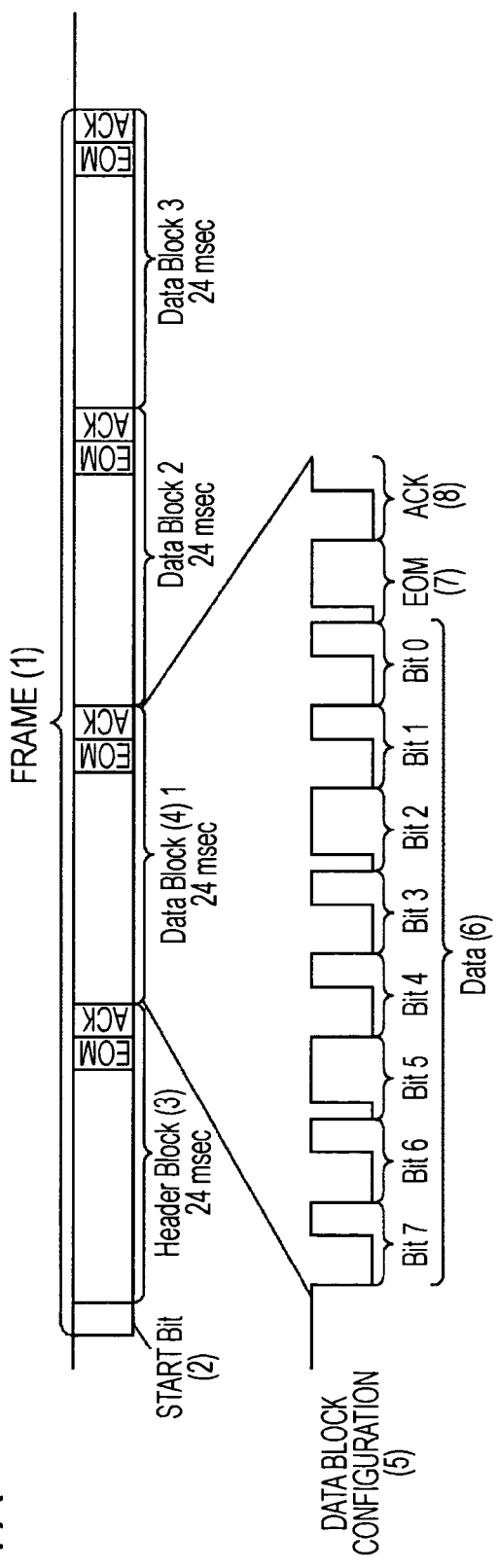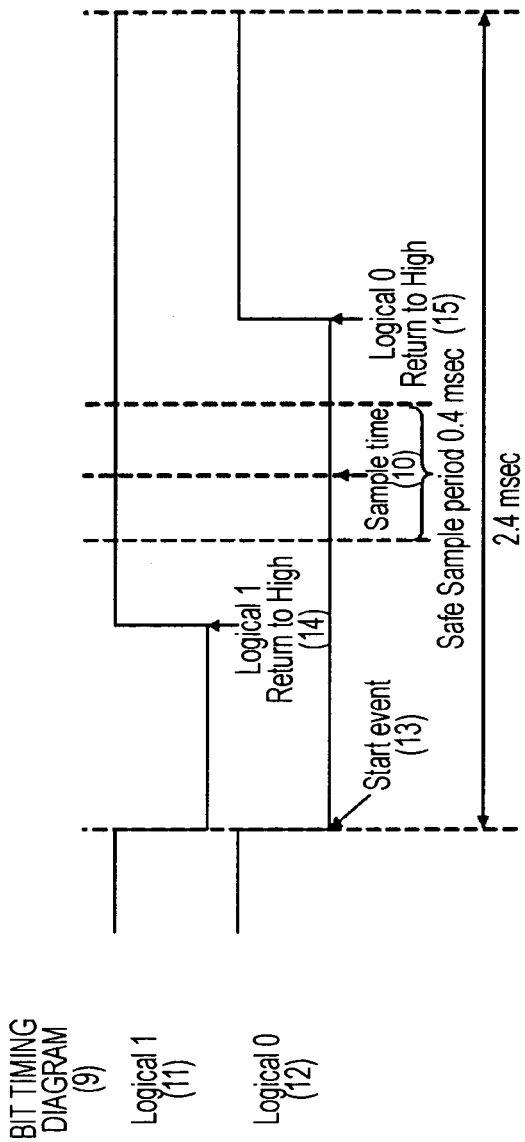
FIG. 7A
FIG. 7B

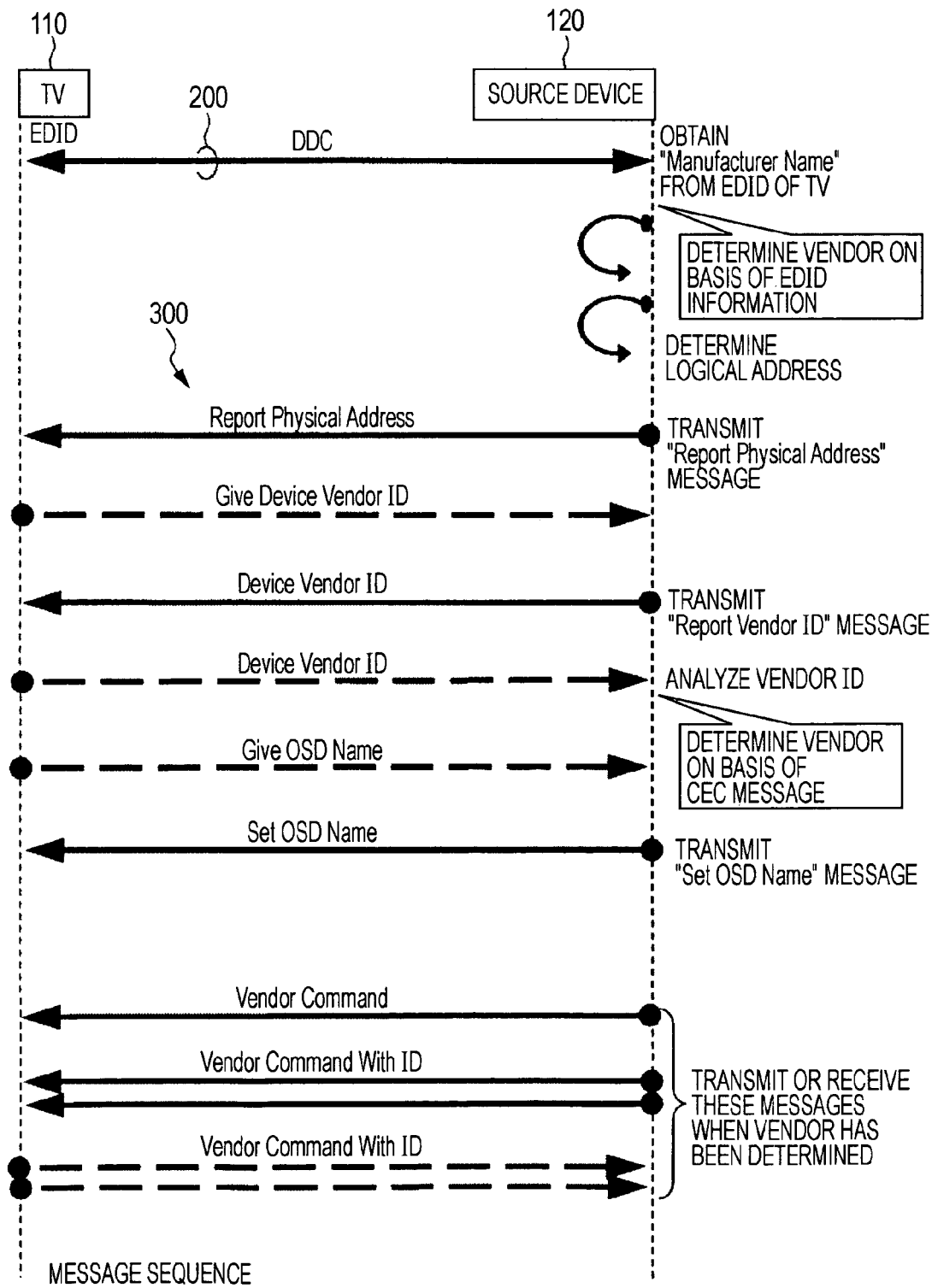

ELECTRONIC DEVICE, COMMUNICATION SYSTEM, METHOD OF COMMUNICATION, AND PROGRAM

The present application claims priority from Japanese Patent Application No. JP 2008-095467, filed in the Japanese Patent Office on Apr. 1, 2008, the entire content of which is incorporated herein by reference.

BACKGROUND OF THE INVENTION

1. Field of the Invention

The present invention relates to an electronic device, a communication system, a method of communication, and a program having or involving a one-directional high-speed communication interface that can transmit pixel data of uncompressed video, such as the High Definition Multimedia Interface (HDMI), for example.

2. Description of the Related Art

According to the HDMI specification, a device functioning as a transmitter device is referred to as an HDMI Source (device), and hereinafter, also referred to as a Source (device); and a device functioning as a receiver device is referred to as an HDMI Sink (device), and hereinafter, also referred to as a Sink (device).

An HDMI Source and an HDMI Sink each have an HDMI connector for connecting an HDMI cable that includes a plurality of signal lines. The HDMI connector is a connector used for transmitting a digital signal of audio and video data.

The specification for HDMI defines the Transition Minimized Differential Signaling (TMDS) channels used for high-speed one-directional transmission of audio and video data from an HDMI Source to an HDMI Sink and the Consumer Electronics Control (CEC) line used for bidirectional communication between an HDMI Source and an HDMI Sink, etc.

In recent years, HDMI has been increasingly used as a high-speed communication interface for transmitting a digital television signal, i.e., pixel data of uncompressed (baseband) video and the accompanying audio data, from audio visual (AV) sources such as a digital versatile disc (DVD) recorder and a set-top box to displays such as a TV receiver (TV) and a projector.

Today, DVD players have an HDMI output port, and TVs or the like have an HDMI input port.

Also, the number of personal computers (PCs) and home camcorders having an HDMI output port for connection to a TV has increased.

CEC is an optional specification within the HDMI specification defined on the basis of P50, which has widely been used in Europe. CEC is a protocol defining a method of bidirectional serial communication that uses one signal line within an HDMI cable.

The data transfer rate of CEC is a low 416 bps (theoretical). CEC has a feature that, by using CEC, devices connected with an HDMI cable can take a form of connection via a bus in a multi-master mode, which allows either device to become an initiator (master) or a follower (slave).

As an example of using CEC, assume a state in which a video player (Source) is connected to a TV (Sink) using HDMI. When the TV is switched off by a remote control of the TV, information regarding the switching off of the TV is transmitted from the TV to the video player via CEC, and both the TV and video player can be simultaneously switched off.

Another example is that depressing a play button of a video player allows simultaneous switching of the input mode of a TV to select a video channel.

These functions allow a user to operate a TV and a video player without having to change a remote control for another.

CEC has a feature that it is the only protocol of proactively transmitting data from a Sink to a Source, in an HDMI system where data is transmitted in one direction from a Source to a Sink. Hence, CEC provides a communication line that allows a TV to transmit data proactively.

Japanese Unexamined Patent Application Publication No. 2007-006298 has disclosed an example where CEC can be used as an auxiliary method for signal transmission between systems connected by HDMI. CEC, which can send and receive information among systems having HDMI connections, is expected to be used in a wider area of applications.

SUMMARY OF THE INVENTION

A vendor unique message used in CEC such as a "Vendor Command" message or a "Vendor Command With ID" message can perform original functions when connections are made among devices manufactured by the same vendor, but it may become an unnecessary message for devices manufactured by other vendors, redundantly occupying the CEC bus line.

Use of a vendor unique message without checking or determining the connected devices may cause the problems listed below.

(1) Messages become unnecessary for a device that does not use the function of the vendor unique message.

(2) These messages, which are allowed extensions, may cause some device to malfunction.

(3) During congestion of a bus, because of an increase in traffic caused by these messages, an important message may be lost, depending on the status or processing speed of a device.

A method to cope with these problems may be to determine whether to send a message using only a vendor ID that is included in a specific CEC message.

However, a device that does not use a "Vendor Command" message may not send a message including a vendor ID. Hence, determination based only on a vendor ID would not be a sufficiently effective method.

It is desirable to provide an electronic device, a communication system, a method of communication, and a program that can prevent a message from becoming unnecessary, suppress the occurrence of a malfunction, and decrease traffic.

An electronic device according to a first embodiment of the present invention includes a Consumer Electronic Control (CEC) device unit and a connected-device determination unit. The electronic device is capable of being connected to another electronic device having Extended Display Identification Data (EDID) information regarding capability, via a communication cable that enables transmission of video and audio data, exchange of connected-device control information, and communication of device control data. The connected-device determination unit determines a vendor of the other electronic device on the basis of at least one of the EDID information and a CEC message of the CEC device unit obtained via the communication cable from the other electronic device, and the connected-device determination unit changes processing on the basis of the vendor of the device connected by the communication cable.

It is preferable that the connected-device determination unit, on the basis of at least one of the EDID information and the CEC message, determine not to transmit a vendor unique message on the basis of a predetermined condition.

It is preferable that the connected-device determination unit be capable of, on the basis of at least one of the EDID information and the CEC message, allowing transmission of a vendor unique message to a specific device when the vendor satisfies a predetermined condition.

It is preferable that the connected-device determination unit be capable of, on the basis of at least one of the EDID information and the CEC message, stopping transmission of a vendor unique message to a specific device when the vendor satisfies a predetermined condition.

It is preferable that the connected-device determination unit be capable of, on the basis of both the EDID information and the CEC message, determining to send a vendor unique message on the basis of a predetermined condition, and realizing message exchange only with a device manufactured by a specific vendor.

It is preferable that the connected-device determination unit analyze an "ID Manufacturer Name" within the EDID information, do not set an "ID Manufacturer Name" flag when the other electronic device is not a device of a vendor that satisfies a predetermined condition, and set the "ID Manufacturer Name" flag when the other electronic device is a device that satisfies the predetermined condition. It is also preferable that the connected-device determination unit, when it receives a "Device Vendor ID" message from the other device, analyze the vendor ID of the "Device Vendor ID" message, do not set a "Vendor" flag when the device is not a device that satisfies a predetermined condition, and set the "Vendor" flag when the device is a device that satisfies the predetermined condition. It is also preferable that the connected-device determination unit do not transmit a vendor unique message via the communication cable when the "ID Manufacturer Name" flag and the "Vendor" flag have not been set, and transmit a vendor unique message via the communication cable when the "ID Manufacturer Name" flag and the "Vendor" flag have been set.

A communication system according to a second embodiment of the present invention includes; a Source device including a Consumer Electronic Control (CEC) device unit; at least one Sink device including a CEC device unit and having Extended Display Identification Data (EDID) information regarding capability; and at least one communication cable that is capable of connecting the Source device and the at least one Sink device and that enables transmission of video and audio data, exchange of connected-device control information, and communication of device control data. The at least one communication cable is capable of transmitting a CEC message and EDID information, and the Source device includes a connected-device determination function that determines a vendor of the at least one Sink device on the basis of at least one of the EDID information and the CEC message obtained via the at least one communication cable from the at least one Sink device, and that changes processing on the basis of the vendor of the at least one Sink device connected by the at least one communication cable.

A method of communication according to a third embodiment of the present invention includes the steps of; connecting a Source device including a Consumer Electronic Control (CEC) device unit and at least one Sink device including a CEC device unit and having Extended Display Identification Data (EDID) information regarding capability, via a communication cable that is capable of connecting the Source device and the at least one Sink Device and that enables transmission of video and audio data, exchange of connected-device control information, and communication of device control data; determining, in the Source device, a vendor of the at least one Sink device on the basis of at least one of the EDID information and a CEC message of the CEC device unit obtained via the communication cable from the at least one Sink device; and changing, in the Source device, processing on the basis of the vendor of the at least one Sink device connected by the communication cable.

A fourth embodiment of the present invention is a recording medium containing a program that causes; in a Source device, the Source device being connected to at least one Sink device via a communication cable, the Sink device including a Consumer Electronic Control (CEC) device unit and having Extended Display Identification Data (EDID) information regarding capability, the cable enabling transmission of video and audio data, exchange of connected-device control information, and communication of device control data; execution of the steps of: determining a vendor of the at least one Sink device on the basis of at least one of the EDID information and a CEC message of the CEC device unit obtained via the communication cable from the at least one Sink device; and changing processing on the basis of the vendor of the at least one Sink device connected by the communication cable.

According to an embodiment of the present embodiment, a message can be prevented from becoming unnecessary, an error in operations can be suppressed, and traffic can be lowered.

BRIEF DESCRIPTION OF THE DRAWINGS

FIG. 3 is a block diagram of a third example basic configuration of the communication system using the method of communication according to the embodiment of the present invention;

FIG. 4 is an example configuration of an HDMI Source and an HDMI Sink;

FIG. 5 illustrates the data structure of EDID;

FIG. 6 illustrates an example configuration of "ID Manufacturer Name" in EDID;

FIGS. 7A and 7B illustrate a first example structure of a CEC message;

FIG. 12 is a chart showing a sequence of message communication steps between a Sink device (TV) and a Source device in the connection of FIG. 1, shown as a reference.

DESCRIPTION OF THE PREFERRED EMBODIMENTS

Embodiments of the present invention will be described with reference to the drawings.

In the present embodiment, description will be made first on an example communication system, followed by an example specific configuration, a process of connected-device determination, which is characteristic of the present embodiment, and the like.

Figure 1:
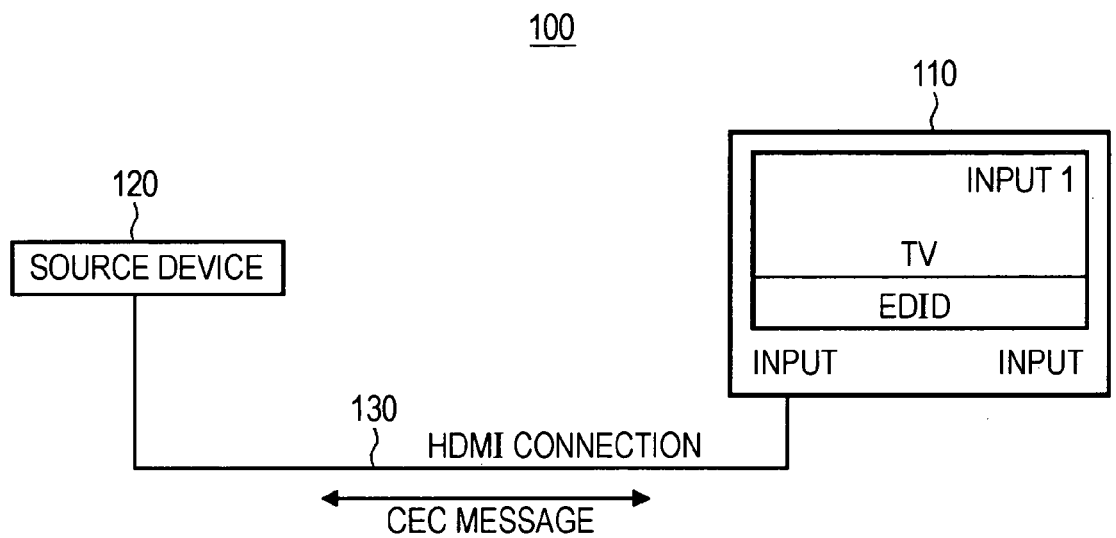
FIG. 1 is a block diagram of a first example basic configuration of a communication system using a method of communication according to an embodiment of the present invention.

FIG. 1 shows a first example configuration of a communication system using a method of communication according to the present embodiment.

Figure 2:
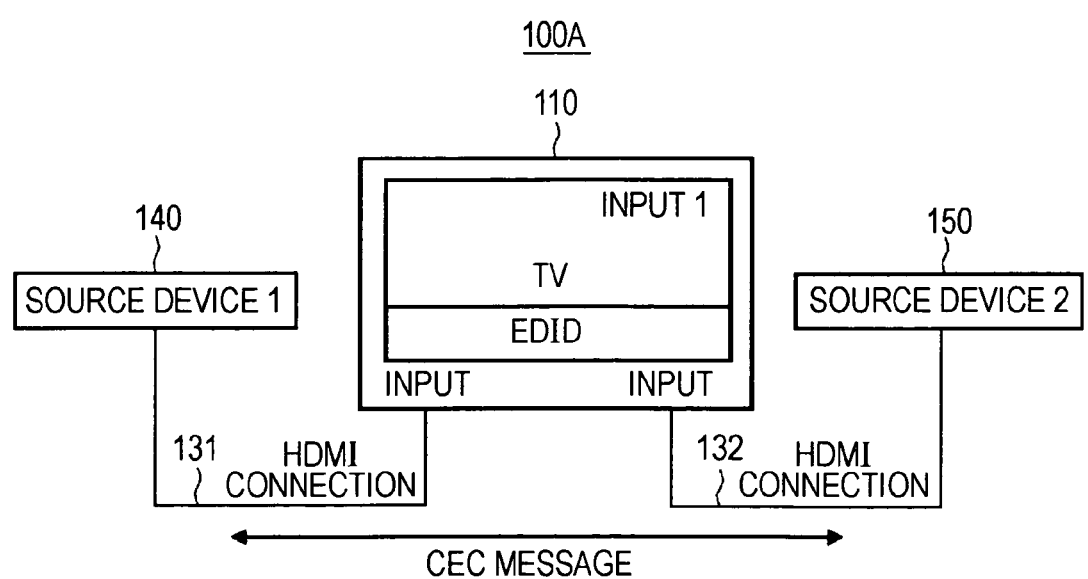
FIG. 2 is a block diagram of a second example basic configuration of the communication system using the method of communication according to the embodiment of the present invention.

FIG. 2 shows a second example basic configuration of the communication system using the method of communication according to the present embodiment.

FIG. 3 shows a third example basic configuration of the communication system using the method of communication according to the present embodiment.

Referring to FIGS. 1 to 3, communication systems 100, 100A and 100B each include TMDS channels that transfer pixel data and audio data in one direction at high speed from an HDMI Source to an HDMI Sink.

The communication systems 100, 100A and 100B can be configured by using communication cables, where each single communication cable allows transmission of audio and video data, exchange and authentication of information about connected devices, data communication for device control, and LAN communication.

The communication system 100 of FIG. 1 includes a Sink device 110 functioning as a receiver, a Source device 120 functioning as a transmitter, as defined in the HDMI specification, and an HDMI cable 130, which is a communication cable between the Sink device 110 and the Source device 120.

In the communication system 100A of FIG. 2, two Source devices 140 and 150 are connected to the single Sink device 110 respectively via HDMI cables 131 and 132.

In the communication system 100B of FIG. 3, one amplifier (AMP) 160 is connected to the single Sink device 110 via an HDMI cable 133, and two Source devices 170 and 180 are connected to the amplifier 160 respectively via HDMI cables 134 and 135.

Examples of electronic devices functioning as the Sink device 110 include video display apparatuses such as TVs including a monitor and a projector.

Examples of electronic devices functioning as the Source devices 120, 140, 150, 170, and 180 are video output apparatuses that output video such as a DVD player, a DVD recorder, a Blu-ray Disc (BD) player, and a communication satellite (CS) tuner.

The basic communication systems 100, 100A and 100B have distinctive connected-device determination functions that utilize EDID information and/or CEC message information, as follows.

Note that EDID is assumed to include Enhanced Extended Display Identification (E-EDID) in the present embodiment.

In the HDMI connection, the basic communication systems have the following:

(1) A connected-device determination function that changes processing on the basis of a vendor of a connected device, by determining the vendor on the basis of EDID information.

(2) A connected-device determination function that changes processing on the basis of a vendor of a connected device, by determining the vendor on the basis of information of a CEC message.

(3) A connected-device determination function that can decrease traffic of a CEC bus line by determining not to send a vendor unique message on the basis of both EDID and a CEC message.

(4) A connected-device determination function that enables a vendor unique message to be transmitted to a specific device on the basis of both EDID and a CEC message.

(5) A connected-device determination function that enables a vendor unique message not to be transmitted to a specific device on the basis of both EDID and a CEC message.

(6) A connected-device determination function that enables communication of a message only with a device of a specific vendor by determining to send a vendor unique message on the basis of both EDID and a CEC message.

(7) A connected-device determination function that determines not to send a message unique to a vendor by determining the vendor on the basis of information of EDID or information of a CEC message.

(8) A connected-device determination function that enables a message unique to a vendor to be transmitted to a specific device by determining the vendor on the basis of EDID information or a CEC message.

Technology elements of HDMI used for realizing the above-described distinctive functions according to the present embodiment will now be described with reference to the basic configuration of FIG. 1.

FIG. 4 shows an example configuration of an HDMI Source and an HDMI Sink each built into respective electronic devices mutually connected by an HDMI cable; for example, the HDMI Source 120 provided in a DVD player and the HDMI Sink 110 provided in a digital TV.

As described in connection with FIG. 1, the HDMI Source 120 and the HDMI Sink 110 are connected by the single HDMI cable 130.

The HDMI Source 120 and the HDMI Sink 110 can perform bi-directional IP communication by using the HDMI cable 130 while keeping compatibility with the HDMI currently being used.

The HDMI Source 120 transmits a differential signal corresponding to pixel data of one-field uncompressed video during a valid video period (also called an active video period as appropriate hereinafter), which is an interval between a vertical synchronization signal and the next vertical synchronization signal excluding a horizontal retrace period and a vertical retrace period, in one direction to the HDMI Sink 110 using a plurality of channels.

The HDMI Source 120 transmits a differential signal corresponding to at least audio data associated with video, control data, other auxiliary data, etc. during the horizontal retrace period or vertical retrace period in one direction to the HDMI Sink 110 using the plurality of channels.

In other words, the HDMI Source 120 has a transmitter 121. The transmitter 121, for example, converts the pixel data of uncompressed video to a corresponding differential signal, and transmits this signal via the plurality of channels, i.e., three TMDS channels #0, #1, and #2, serially in one direction to the HDMI Sink 110, which is connected via the HDMI cable 130.

The transmitter 121 also converts the audio data associated with the uncompressed video, necessary control data, other auxiliary data etc. to a corresponding differential signal, and transmits this signal via the three TMDS channels #0, #1, and #2, serially in one direction to the HDMI Sink 110, which is connected via the HDMI cable 130.

In addition, the transmitter 121 transmits, via a TMDS clock channel, a pixel clock that is synchronized with the pixel data transmitted via the three TMDS channels #0, #1, and #2, to the HDMI Sink 110 connected via the HDMI cable 130. Here, 10 bits of pixel data are transmitted per TMDS channel #i (i=0, 1, and 2) during one pixel clock period.

The HDMI Sink 110 receives, during an active video period via the plurality of channels, the differential signal corresponding to pixel data transmitted in one direction from the HDMI Source 120. In addition, the HDMI Sink 110 receives, during a horizontal retrace period or vertical retrace period via the plurality of channels, the differential signal corresponding to audio data and control data, transmitted in one direction from the HDMI Source 120.

In other words, the HDMI Sink 110 has a receiver 111. The receiver 111 receives, via the TMDS channels #0, #1, and #2, the differential signal corresponding to pixel data and the differential signal corresponding to audio data and control data that are transmitted in one direction from the HDMI Source 120 connected via the HDMI cable 130, in synchronization with the pixel clock that is transmitted via the TMDS clock channel also from the HDMI Source 120.

In addition to the three TMDS channels #0 to #2 functioning as transmission channels used to transmit pixel data and audio data in one direction from the HDMI Source 120 to the HDMI Sink 110 synchronizing with the pixel clock, and the TMDS channels functioning as transmission channels used for transmitting the pixel clock, the transmission channels of the HDMI system having the HDMI Source 120 and the HDMI Sink 110 also include a Display Data Channel (DDC) 200 and a CEC line 300.

The DDC 200 is constituted by two lines (not shown) included within the HDMI cable 130, and is used for the HDMI Source 120 to read out E-DID from the HDMI Sink 110 connected via the HDMI cable 130.

In other words, the HDMI Sink 110 has an EDID read only memory (EDIDROM) 112 that stores E-EDID, which is information concerning setting and capability of the receiver 111 and the HDMI Sink 110 itself.

The HDMI Source 120 reads out, from the HDMI Sink 110 connected via the HDMI cable 130, E-EDID that is stored in the EDIDROM 112 of the HDMI Sink 110, via the DDC 200. On the basis of the information of the E-EDID, the HDMI Source 120 recognizes the setting and capabilities of the HDMI Sink 110, i.e., for example, a video format (profile) supported by (an electronic device having) the HDMI Sink 110 such as YcbCr4:4:4 or YcbCr4:2:2 of red, green and blue (RGB).

Note that the HDMI Source 120 may also store E-EDID information (not shown), as in the HDMI Sink 110, and send the format information contained in the E-EDID to the HDMI Sink 110 as necessary.

As described above, EDID is stored in an EEPROM provided within a TV that supports Digital Visual Interface (DVI) and/or HDMI.

The EDID includes data that describes, for example, the resolution and audio capabilities of the TV.

FIG. 5 shows the data structure of EDID.

FIG. 6 shows an example configuration of "ID Manufacturer Name" in EDID.

The "Base Block (Block 0)" portion of EDID is formed of 128 bytes of data.

Referring to FIG. 5, an "ID Manufacturer Name" is described in EDID at a location having the addresses 0x08 to 0x09.

In the present embodiment, the connected-device determination function uses this "ID Manufacturer Name" data.

FIG. 6 shows, as an example, the data structure of the "ID Manufacturer Name" for the case of SONY.

As described above, the signal lines of the HDMI cable 130 include those for the DDC 200.

The lines for the DDC 200 are used for communication of data between a Sink device such as a TV and a connected Source device.

The communication protocol used is an I2C-bus-based technology called DDC.

The DDC 200 is mainly used for the transmission of EDID as well as High-bandwidth Digital Content Protection (HDCP) authentication, etc.

The CEC line 300 is constituted by a single signal line (not shown) included in the HDMI cable 130, and is used for bidirectional communication of control data between the HDMI Source 120 and the HDMI Sink 110.

The HDMI Source 120 and the HDMI Sink 110 can communicate data in both directions by respectively transmitting to the HDMI Sink 110 and the HDMI Source 120, for example, IEEE 802.3 compliant frames, via the DDC 200 or the CEC line 300. Note that IEEE refers to Institute of Electrical and Electronics Engineers.

In addition, the HDMI cable 130 includes a signal line 400 that is connected to a pin called a "Hot Plug Detect" pin. The HDMI Source 120 and the HDMI Sink 110 can detect a new connection of an electronic device, i.e., a connection of the HDMI Sink 110 or the HDMI Source 120, by using the signal line 400.

As described above, the signal lines making up the HDMI cable 130 include the CEC line 300.

Via the CEC line 300, communication of CEC messages is performed.

The CEC messages include a "Device Vendor ID" message that contains an ID unique to a vendor.

In the present embodiment, the above described connected-device determination function utilizes this message transmitted from other devices.

FIGS. 7A and 7B show a first example structure of a CEC message.

Figure 8:
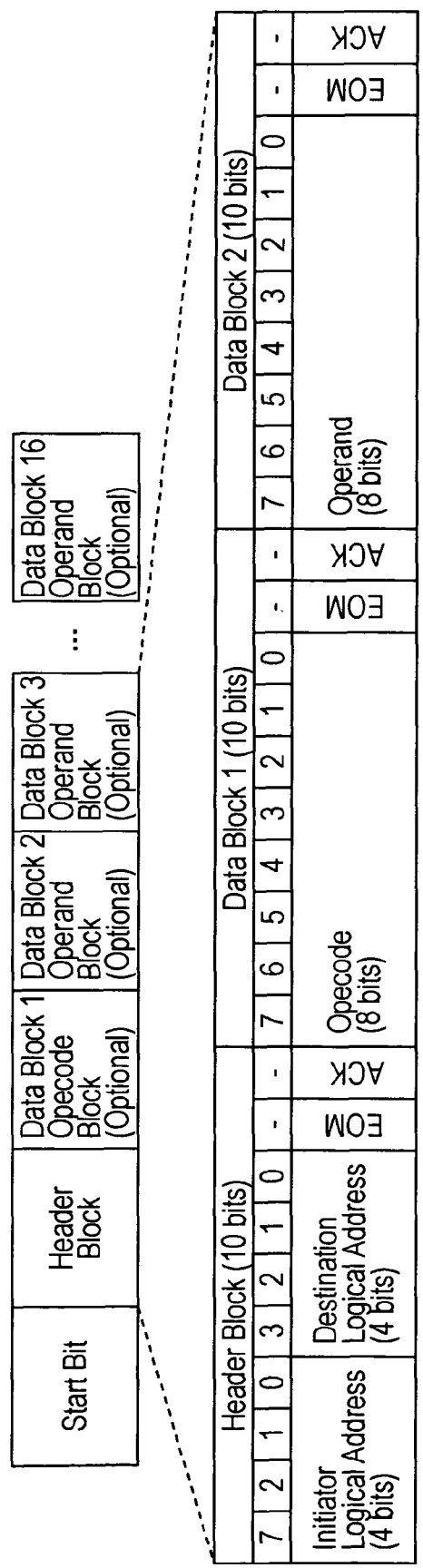
FIG. 8 illustrates a second example structure of a CEC message.

FIG. 8 shows a second example structure of a CEC message.

Figure 9:
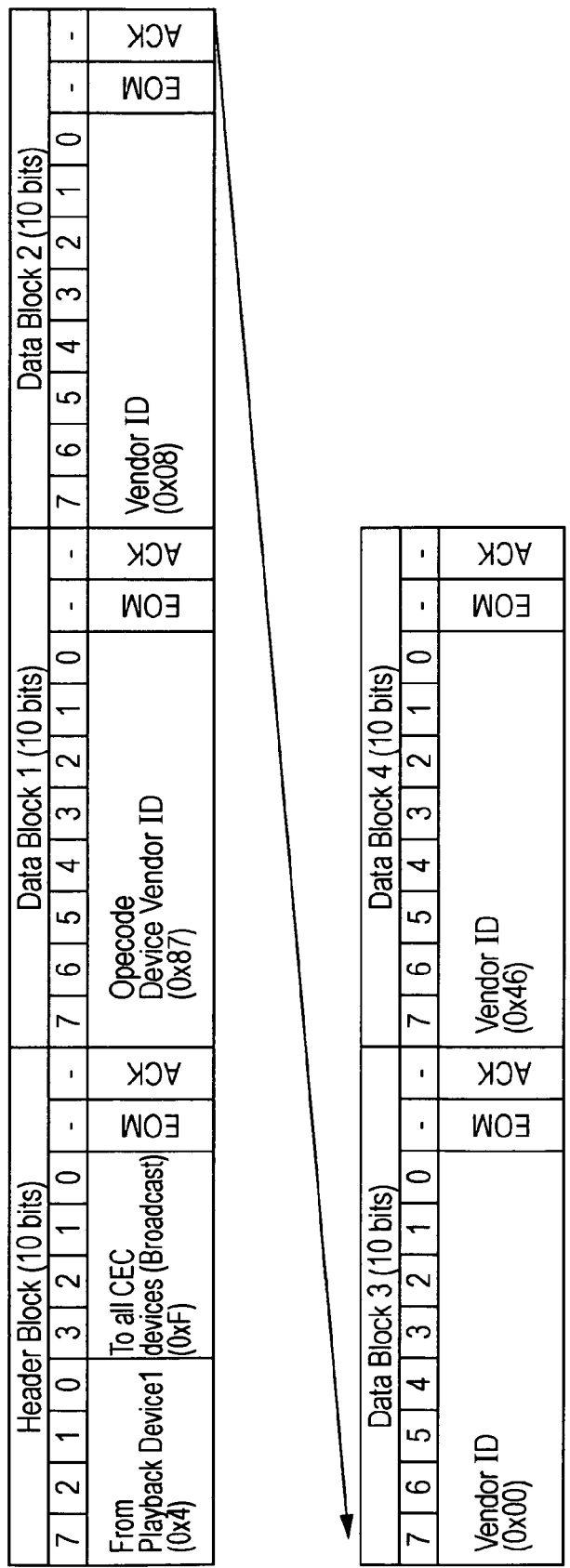
FIG. 9 illustrates a structure of a "Device Vendor ID" message.

FIG. 9 shows the structure of a "Device Vendor ID" message.

Referring to FIGS. 7A, 7B and 8, a CEC message has, at the beginning, a "Header" portion, which contains logical address data of a sending device and a receiving device among the connected devices.

For instance, the "Device Vendor ID" message in the example of FIG. 9 contains logical address data for a case where a "Playback Device 1" broadcasts to all of the connected devices.

Using the communication system 100A of FIG. 2 as an example, a specific example configuration of an HDMI Sink and HDMI Sources connected by HDMI cables each including a CEC line will now be described.

Figure 10:
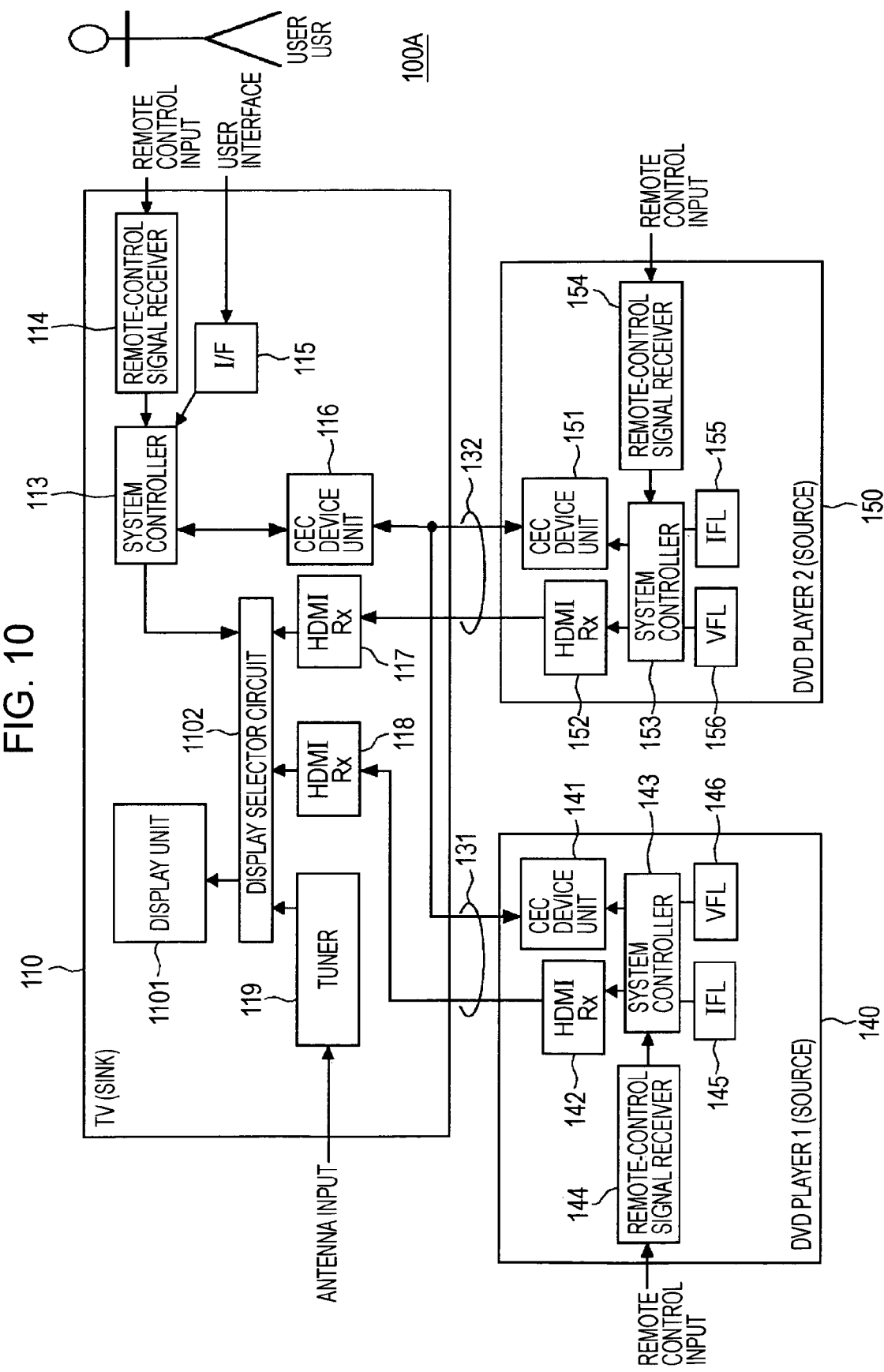
FIG. 10 is a block diagram of a specific example configuration of the communication system of FIG. 2.

FIG. 10 shows a specific example configuration of the communication system of FIG. 2.

The communication system 100A of FIG. 10 is configured in such a manner as to permit high-level cooperation among devices having CEC connections, by realizing high-speed communication while keeping compatibility with existing CEC devices.

An example is shown here, in which a TV functioning as the Sink device 110 is connected to two DVD players manufactured by SONY functioning as the Source devices 140 and 150 via the HDMI cables 131 and 132 including CEC lines.

The Sink device 110 (TV) has a display unit 1101, a display selector circuit 1102, a system controller 113, a remote-control signal receiver 114, a user interface (I/F) 115, a CEC device unit 116, HDMI receivers (Rx's) 117 and 118, and a tuner 119.

A Source device 140 (DVD player 1) has a CEC device unit 141, an HDMI transmitter (Tx) 142, a system controller 143 functioning as a connected-device determination unit, and a remote-control signal receiver 144.

A Source device 150 (DVD player 2) has a CEC device unit 151, an HDMI transmitter (Tx) 152, a system controller 153 functioning as a connected-device determination unit, and a remote-control signal receiver 154.

In the present embodiment, the Source devices 140 and 150, each being a DVD player, respectively hold content CNT0 and content CNT1 (content CNT0 and content CNT1 being different from each other), for example.

The content CNT0 and content CNT1 held in the Source devices 140 and 150 are respectively listed, for example, in lists LIST1 and LIST2, which are stored in respective memories of the Source devices 140 and 150. A user USR can determine the content in the Source devices 140 and 150 by looking at these lists.

In the present embodiment, the Source devices 140 and 150, which are connected to the HDMI Sink 110, analyze "ID Manufacturer Name" within the EDID information transmitted through the DDC 200 from the HDMI Sink 110 (TV).

When it is determined that the analysis result is not SONY, the system controllers 143 and 153 functioning as the connected-device determination units of the Source devices 140 and 150 do not set "ID Manufacturer Name" flags (IFLs) 145 and 155 provided in the memories. For instance, the system controllers 143 and 153 of the Source devices 140 and 150 set the "ID Manufacturer Name" flags 145 and 155 to logical "0".

When it is determined that the analysis result is SONY, the system controllers 143 and 153 of the Source devices 140 and 150 set the "ID Manufacturer Name" flags 145 and 155 provided in the memories. For instance, the system controllers 143 and 153 of the Source devices 140 and 150 set the "ID Manufacturer Name" flags 145 and 155 to logical "1".

The system controllers 143 and 153 of the Source devices 140 and 150, when receiving a "Device Vendor ID" message from another device, analyze the vendor ID of the "Device Vendor ID" message.

When it is determined that the analysis result is not SONY, the system controllers 143 and 153 of the Source devices 140 and 150 do not set "Vendor" flags (VFLs) 146 and 156 provided in the memories. For instance, the system controllers 143 and 153 of the Source devices 140 and 150 set the "Vendor" flags 146 and 156 to logical "0".

When it is determined that the analysis result is SONY, the system controllers 143 and 153 of the Source devices 140 and 150 set the "Vendor" flags 146 and 156 provided in the memories. For instance, the system controllers 143 and 153 of the Source devices 140 and 150 set the "Vendor" flags 146 and 156 to logical "1".

Furthermore, the system controllers 143 and 153 of the Source devices 140 and 150, when the "ID Manufacturer Name" flags 145 and 155 and the "Vendor" flags 146 and 156 have not been set, do not transmit a vendor unique message such as a "Vendor Command" message or a "Vendor Command With ID" message over the CEC bus lines.

The system controllers 143 and 153 of the Source devices 140 and 150, when the "ID Manufacturer Name" flags 145 and 155 and the "Vendor" flags 146 and 156 have been set, transmit a vendor unique message such as a "Vendor Command" message or a "Vendor Command with ID" message over the CEC bus lines.

When CEC is used in the communication system 100A, the user (USR), by using a remote control, transmits a command indicating an explicit desire to view the content CNT0 of the Source device 140 (DVD player), via the remote-control signal receiver 114 of the HDMI Sink 110 (TV).

Then, the system controller 113 of the HDMI Sink 110 (TV), causes the display selector circuit 1102 to select the HDMI receiver 118 receiving the video of the Source device 140, and transmits the command received from the remote-control signal receiver 114 to the system controller 143 of the Source device 140 through the CEC device unit 116 and the CEC device unit 141.

When the user USR wants to view the content CNT1 of the Source device 150 (DVD player), the user USR transmits a command indicating an explicit desire to view the content CNT1 of the Source device 150 (DVD player).

Then, the system controller 113 of the HDMI Sink 110 (TV) causes the display selector circuit 1102 to select the HDMI receiver 117, and transmits the command from the user USR to the system controller 153 of the Source device 150 through the CEC device unit 116 and the CEC device unit 151.

As described above, the user USR, who wants to explicitly know the content CNT0 and CNT1 of the Source devices 140 and 150 (DVD players), can advantageously operate the devices using CEC in such a manner as to allow the system controller 113 to automatically set the display selector circuit 1102.

In addition, since CEC is a mechanism that allows a Sink device to proactively transmit information to a Source device, implementing CEC allows a TV, which is an input device, to become an output device by using a single HDMI cable.

For instance, an existing touch panel monitor has an RS232C cable or a USB interface for outputting touch panel information in addition to an AV input. However, this function can be realized by using only a single HDMI cable.

This configuration can add increased value to a TV and significantly extend an area of cooperation among devices including a central TV.

A CEC protocol in the present embodiment will now be described with reference to the previously mentioned FIGS. 7A and 7B.

CEC Protocol

FIGS. 7A and 7B show a normal CEC protocol.

In this case, communication is performed in units of frames. A frame (1) is made up of a START bit (2), a header block (3), and a number of data blocks (4).

The number of data blocks ranges from a minimum of one to a maximum of 16. Referring to FIG. 7A showing a data block configuration (5), a data block is constituted by 8-bit data (6), 1-bit EOM (7), and 1-bit ACK (8), a total of 10 bits. Of these, the ACK, different from others, is transmitted by a follower (slave).

All the bits except for START bit have the same timing as shown in the bit timing diagram (9) of FIG. 7B. A logical 1 (11) and a logical 0 (12) are determined on the basis of the polarity of a pulse at a Sample time (10), where a pulse starts at the falling edge of the previous pulse.

Start event (13), Sample time (10), and Return to High (14) and (15) making up one bit have margins all defined by the specification. The nominal duration of one bit is 2.4 milliseconds, leading to a theoretical transmission rate of 416 bps.

The EOM, which means end of message, indicates the end of a data block showing that the current data block is the final block of the communication. A follower can detect the end of a frame by detecting an EOM.

Next, a connected-device determination function according to the present embodiment in the communication system described above will be described.

For ease of understanding, description will be made, as an example, for a case of configuring the communication system of FIG. 1 where a Sink device and a Source device have a one-to-one connection.

The Source device and the Sink device have configurations similar to those of FIG. 10.

Figure 11:
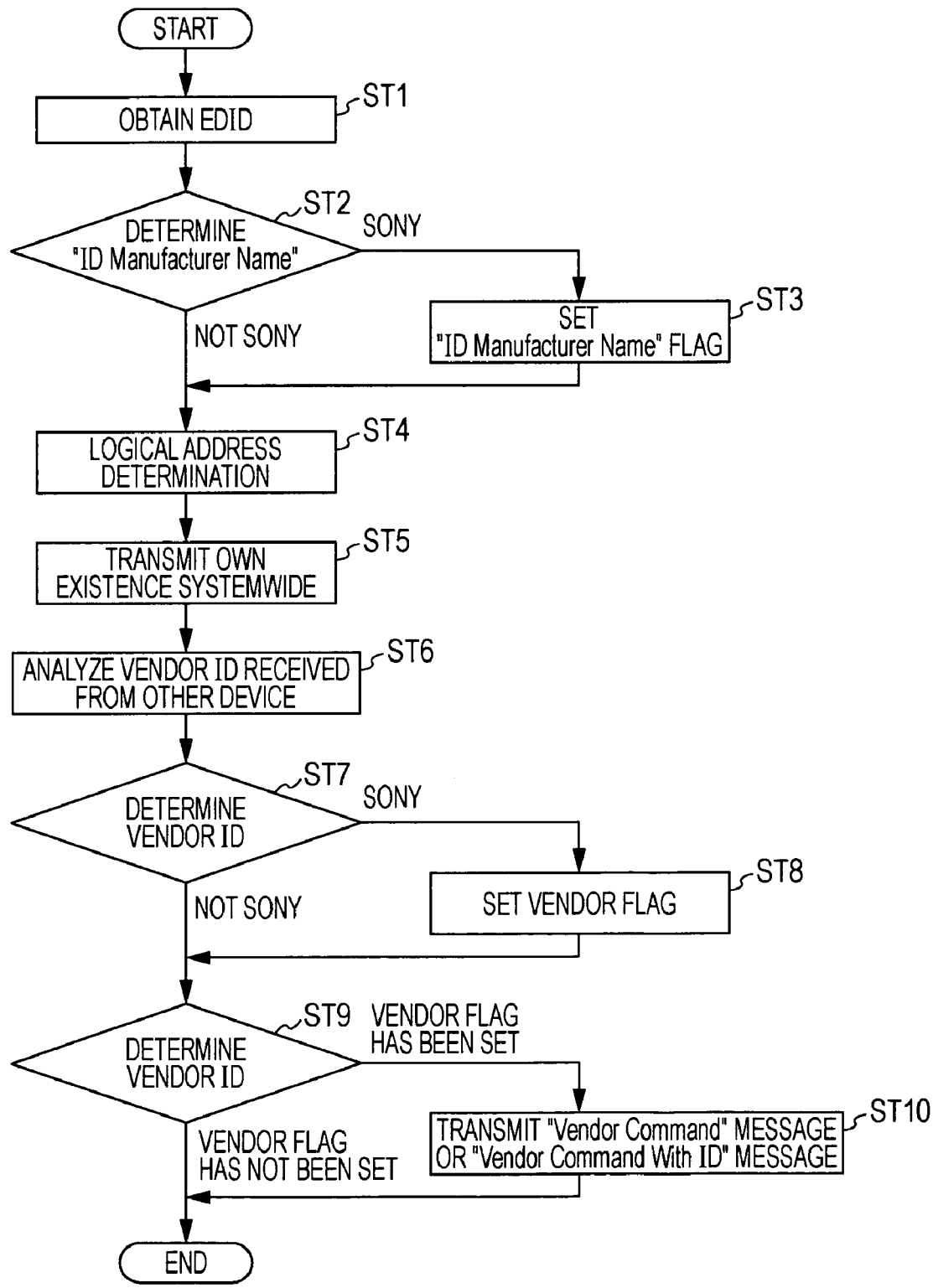
FIG. 11 is a flowchart used for explaining the operation of a connected-device determination function in the communication system according to the present embodiment.

FIG. 11 shows a flowchart used for explaining the operation of the connected-device determination function in the communication system according to the present embodiment.

FIG. 12 shows a sequence of message communication steps between a Sink device (TV) and a Source device in the connection of FIG. 1, as a reference.

Condition 1

The connection of FIG. 1 is configured.

The TV is a product manufactured by a vendor other than SONY in condition 1.

The Source device 120 is a product manufactured by SONY.

The Source device 120, when it has confirmed the connection with the Sink device 110 (TV), reads the EDID information of the Sink device 110 (TV) through the DDC 200 (step ST1).

Then the "ID Manufacturer Name" within the EDID is analyzed (step ST2).

Since it is determined that the device is not a SONY product in this case, an "ID Manufacturer Name" flag provided in the memory of the Source device 120 is not set.

Messages are communicated in this state between the Sink device 110 (TV) and the Source device 120 (steps ST4 to ST6).

For example, the Source device 120 determines a logical address and transmits its own physical address to the Sink device 110 (TV).

The Source device 120, when receiving a "Give Device Vendor ID" message from the Sink device 110, transmits its own "Device Vendor ID" message to the Sink device 110.

The Source device 120, when receiving a "Device Vendor ID" message from the other device, analyzes the vendor ID of the "Device Vendor ID" message (steps ST6 and ST7).

The Source device 120, since it determines that the device is not a SONY product in this case, does not set a "Vendor" flag provided in the memory of the Source device 120.

The Source device 120 determines whether or not the connected TV is a SONY product on the basis of the "Vendor" flag (step ST9).

The Source device 120, since the "ID Manufacturer Name, flag and the "Vendor" flag have not been set, does not transmit a "Vendor Command" message or a "Vendor Command With ID" message, which are vendor unique messages, on the CEC bus line.

Condition 2

The connection of FIG. 1 is configured.

The TV is a product manufactured by SONY in condition 2.

The Source device 120 is a product manufactured by SONY.

The Source device 120, when it has confirmed the connection with the Sink device 110 (TV), reads the EDID information of the Sink device 110 (TV) through the DDC 200 (step ST1).

Then the "ID Manufacturer Name" within the EDID is analyzed (step ST2).

Since it is determined that the device is a SONY product in this case, an "ID Manufacturer Name" flag provided in the memory of the Source device 120 is set (step ST3).

Messages are communicated in this state between the Sink device 110 (TV) and the Source device 120 (steps ST4 to ST6).

For example, the Source device 120 determines a logical address and transmits its own physical address to the Sink device 110 (TV).

The Source device 120, when receiving a "Give Device Vendor ID" message from the Sink device 110, transmits its own "Device Vendor ID" message to the Sink device 110.

The Source device 120, when receiving a "Device Vendor ID" message from the other device, analyzes the vendor ID of the "Device Vendor ID" message (steps ST6 and ST7).

The Source device 120, since it determines that the device is a SONY product in this case, sets a "Vendor" flag provided in the memory of the Source device 120 (step ST8).

The Source device 120 determines whether or not the connected TV is a SONY product on the basis of the "Vendor" flag (step ST9).

The Source device 120, since the "ID Manufacturer Name" flag and the "Vendor" flag have been set, can transmit a "Vendor Command" message or a "Vendor Command With ID" message, which is a vendor unique message, only to desired devices via the CEC bus line (step ST10).

For instance, the connected-device determination function according to the present embodiment can be used to provide different menus etc., on the basis of whether a device manufactured by other manufacturers is connected or a device manufactured by the same manufacturer is connected.

This allows differentiation of functions to be realized on the basis of the devices being used as follows: a menu of basic operations is provided in the case where devices manufactured by other vendors are connected, whereas a menu allowing enhanced operations is provided in the case where devices manufactured by the same vendor are connected.

Similar processing is possible, irrespective of the number of connected devices, for the case of a plurality of connections where, for example, another Source device and/or an amplifier are connected as shown in FIGS. 2 and 3.

As described above, according to the present embodiment, a Source device, when a Sink device is connected, analyzes an "ID Manufacturer Name" within the EDID information of the Sink device (TV) transmitted through the DDC.

The Source device does not set an "ID Manufacturer Name" flag when the analysis result is not, for example, SONY, and sets the "ID Manufacturer Name" flag when the analysis result is SONY.

The Source device, when receiving a "Device Vendor ID" message from the other device, analyzes the vendor ID of the "Device Vendor ID" message.

The Source device, when the vendor is determined not to be SONY as the result of the analysis, does not set a "Vendor" flag, and sets the "Vendor" flag when the analysis result is SONY.

The Source device, when the "ID Manufacturer Name" flag and the "Vendor" flag have not been set, does not transmit, for example, a "Vendor Command" message or a "Vendor Command With ID" message, which are vendor unique messages, on the CEC bus line. When the "ID Manufacturer Name" flag and the "Vendor" flag have been set, the Source device transmits a "Vendor Command" message or a "Vendor Command With ID" message, which are vendor unique messages on the CEC bus line.

Hence, the present embodiment can provide the following advantages:

The traffic of a CEC bus line can be decreased in various cases of connections.

In many cases where not all devices connected to HDMI are manufactured by the same vendor, redundant vendor unique messages are prevented from being given or transmitted to devices manufactured by other vendors.

For instance, when a TV and a Source device connected one-to-one as shown in FIG. 1 are products of different vendors, redundant vendor unique messages are prevented from being given to a device manufactured by a vendor other than the vendor of the sending device.

As another example, also in the case where all the devices connected by HDMI to the Source device are products of vendors different from the vendor of the Source device, redundant messages are prevented from being transmitted.

All the connected devices connected by HDMI can be covered as valid devices.

A condition using only EDID would limit the devices only to devices having EDID, and a condition using only a vendor ID of a CEC message would not cover devices that do not send a message including a vendor ID.

Hence, a condition using both EDID and a CEC message would allow a wider spectrum of connections to be covered.

Since vendor unique messages on a CEC bus line decrease in number, the CEC bus line would become more stable and have improved connectivity with devices of other vendors.

Since determination of vendors is possible, the following applications according to a vendor can be realized in addition to the above.

For example, the timing of sending CEC messages can be changed for a certain vendor.

A first device can be configured so that when it receives a CEC message from a second device of a certain vendor other than the vendor of the first device, the first device will operate differently from the case where both devices are manufactured by the same vendor.

HDCP authentication timing can be changed.

It should be noted that the method described above in detail may be implemented by a program corresponding to the processing described above and the program may be executed on a computer such as a Central Processing Unit (CPU).

By storing the program in a recording medium such as a semiconductor memory, a magnetic disk, an optical disk, or a floppy (registered trademark) disk, the program may be accessed and executed by a computer in which the recording medium is set.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
a Consumer Electronic Control (CEC) device unit; and
a connected-device determination unit,
wherein the electronic device is capable of being connected to another electronic device having Extended Display Identification Data (EDID) information regarding capability, via a communication cable that enables transmission of video and audio data, exchange of connected-device control information, and communication of device control data,
wherein the connected-device determination unit determines a vendor of the other electronic device on the basis of at least one of the EDID information and a CEC message of the CEC device unit obtained via the communication cable from the other electronic device, and the connected-device determination unit changes processing on the basis of the vendor of the device connected by the communication cable,
wherein the connected-device determination unit analyzes an "ID Manufacturer Name" within the EDID information, does not set an "ID Manufacturer Name" flag when the other electronic device is not a device of a vendor that satisfies a predetermined condition, and sets the "ID Manufacturer Name" flag when the other electronic device is a device that satisfies the predetermined condition,
wherein the connected-device determination unit, when it receives a "Device Vendor ID" message from the other device, analyzes the vendor ID of the "Device Vendor ID" message, does not set a "Vendor" flag when the device is not a device that satisfies a predetermined condition, and sets the "Vendor" flag when the device is a device that satisfies the predetermined condition, and
wherein the connected-device determination unit does not transmit a vendor unique message via the communication cable when the "ID Manufacturer Name" flag and the "Vendor" flag have not been set, and transmits a vendor unique message via the communication cable when the "ID Manufacturer Name" flag and the "Vendor" flag have been set.

* * * * *